United States Patent [19]

Lewis et al.

[11] Patent Number: 4,668,655
[45] Date of Patent: May 26, 1987

[54] CATALYST COMPOSITION FOR CATALYTIC CRACKING

[75] Inventors: Paul H. Lewis, Groves; Eugene P. Dai, Port Arthur; Edward H. Holst, Nederland, all of Tex.

[73] Assignee: Texaco Inc., White Plains, N.Y.

[21] Appl. No.: 840,240

[22] Filed: Mar. 17, 1986

Related U.S. Application Data

[60] Division of Ser. No. 752,871, Jul. 8, 1985, Pat. No. 4,606,898, which is a continuation-in-part of Ser. No. 522,078, Aug. 11, 1983, abandoned.

[51] Int. Cl.$^4$ .................. B01J 21/04; B01J 23/04; B01J 23/10
[52] U.S. Cl. ..................... 502/304; 502/64; 502/65; 502/302; 502/303; 502/317; 502/344; 208/120
[58] Field of Search ............... 502/304, 344, 400, 415, 502/64, 65, 302, 303, 317; 208/120

[56] References Cited

U.S. PATENT DOCUMENTS

| | | | |
|---|---|---|---|
| 3,428,575 | 2/1969 | Pijpers et al. | 423/244 X |
| 4,002,720 | 1/1977 | Wheelock et al. | 502/304 X |
| 4,254,293 | 3/1981 | Tremont et al. | 502/304 X |
| 4,344,926 | 8/1982 | Petty et al. | 423/244 |
| 4,346,063 | 8/1982 | Cahn et al. | 423/244 X |

*Primary Examiner*—W. J. Shine
*Attorney, Agent, or Firm*—Robert A. Kulason; James J. O'Loughlin; Carl G. Seutter

[57] ABSTRACT

A catalyst composition for catalytic cracking contains a catalytic cracking catalyst and 1–10 weight %, of the total, of additive containing a porous refractory support bearing 0.5–10 weight % of at least one of bismuth, chromium or a rare earth metal and 0.4–10 weight % of an alkali metal.

3 Claims, No Drawings

CATALYST COMPOSITION FOR CATALYTIC CRACKING

RELATED APPLICATION

This is a division of application Ser. No. 752,871, filed July 8, 1985, now U.S. Pat. No. 4,606,898 issued Aug. 19, 1986, which is a continuation-in-part application of application Ser. No. 522,078 filed Aug. 11, 1983, now abandoned, for control of $SO_x$ Emission by Paul H. Lewis, Eugene P. Dai, and Edward H. Holst

FIELD OF THE INVENTION

This invention relates to a process for removing a gaseous sulfur compound from a mixture of gases containing sulfur oxides. More particularly, it relates to fluid catalytic cracking under conditions whereby the sulfur oxide content of the regenerator off-gas is lowered.

BACKGROUND OF THE INVENTION

As is well known to those skilled in the art, when sulfur-containing charge hydrocarbons are admitted to a fluid catalytic cracking (FCC) reactor, the charge is converted to lower boiling products including those falling within the motor fuel boiling range. A portion of the sulfur in the charge hydrocarbon is liberated in the reactor as hydrogen sulfide and mercaptans which may be separated from the FCCU cracked products. A portion of the sulfur is fixed on the coke-containing spent catalyst which is passed from the reaction zone to the regeneration zone wherein an oxygen-containing gas is provided to regenerate the spent catalyst. The gas formed during regeneration includes oxides of carbon as the coke is burned from the surface of the catalyst. The gas so formed also includes oxides of sulfur (principally sulfur dioxide plus some sulfur trioxide); and these oxides of the sulfur may be the predominant undesirable species in the regenerator off-gas.

Economic considerations prevent the effective removal of sulfur oxides from the regenerator off-gas; and environmental considerations dictate that they be decreased. Prior art attempts include operation under conditions such that the sulfur in the regeneration zone is fixed on the catalyst (thereby lowering the $SO_x$ content of the regenerator off-gas); and the sulfur is released as additional mercaptan and hydrogen sulfide in the reaction zone. Here these sulfur compositions may be readily passed to effluent separation operations which would not be the case for sulfur-containing gases recovered as regenerator waste-gas.

Illustrative of prior art endeavors in this area include those disclosed in U.S. Pat. No. 4,344,926 which issued Aug. 17, 1982 to Texaco Inc. as assignee of Randall H. Petty and Burton H. Bartley (the text of which is incorporated herein by reference) and the prior art cited therein.

It is an object of this invention to provide a process for removing a gaseous sulfur compound from a mixture of gases containing sulfur oxides. Other objects will be apparent to those skilled in the art.

STATEMENT OF THE INVENTION

In accordance with certain of its aspects, this invention is directed to a process for removing a gaseous sulfur compound from a mixture of gases containing sulfur oxides which comprises contacting said mixture of gases containing sulfur oxides at 800° F.–1500° F. (427° C.–816° C.) with a composite containing a porous refractory support bearing as a first component (i) at least one of bismuth, chromium, or a rare earth metal, such as cerium and as a second component (ii) at least one alkali metal.

DESCRIPTION OF THE INVENTION

The mixture of gases which may be treated by the process of this invention include gases which contain sulfur oxides; and commonly such gases are found to contain, as the principal oxide of sulfur, sulfur dioxide—with lesser quantities of sulfur trioxide.

In the preferred embodiment, this invention finds use in connection with fluid catalytic cracking (FCC) wherein a charge hydrocarbon is subjected to cracking conditions include temperature of 800° F.–1200° F. (427° C.–649° C.), typically 960° F. (516° C.) to yield cracked product containing hydrocarbons boiling in the motor fuel boiling range. When the charge to cracking (typically a gas oil) contains sulfur, a portion of this sulfur is reduced in the reaction zone to hydrogen sulfide and mercaptans which are recovered with the cracked product from which they may readily be separated.

During reaction, the fluid catalyst particles become deactivated as they are covered with coke; and they also pick up a substantial portion of sulfur. This spent catalyst is passed to a regeneration zone wherein spent catalyst is contacted with oxygen-containing gas, typically air, at 1100° F.–1500° F. (595° C.–815° C.), typically 1350° F. (732° C.); and under these conditions, the spent catalyst is regenerated and may thereafter be returned to the reaction zone. During regeneration, the coke content of the spent catalyst is oxidized to form regenerator off-gas including carbon dioxide and carbon monoxide. Sulfur in the spent catalyst is oxidized to form sulfur dioxide and sulfur trioxide. The content of $SO_x$ (oxides of sulfur) in the regenerator off-gas, when the initial sulfur-containing charge contains 0.5 w%–2.5 W%, say 2 w% sulfur, may be as high as 4 w%–5 w%, say 5 w% of the sulfur content of the charge hydrocarbon to the reaction zone. The $SO_x$ content of regenerator off gas under these conditions may be 2000–3000 ppm(v), say 2500 ppm(v).

It is a feature of the process of this invention that the $SO_x$ content of these sulfur-containing gases may be reduced by contacting these gases at 800° F.–1500° F. (427° C.–815° C.), preferably 1000° F.–1500° F. (595° C.–815° C.) say 1350° F. (732° C.) with a composite containing a porous refractory support bearing as a first component (i) at least one of bismuth, chromium, or a rare earth metal such as cerium and as a second component (ii) at least one alkali metal, preferably potassium or sodium or cesium.

The porous refractory support which may be employed in practice of the process of this invention may be active or inactive or inert. Typical of such supports may be alumina (e.g. gamma alumina), silica, magnesia, silica-alumina, silica-magnesia, mordenite, zeolites, etc. When toe $SO_x$-containing gases are passed from the regeneration zone to a separate conversion zone, the support may be any convenient support whether active or inactive or inert and may be of a particle size comparable to that utilized in fluid bed operations (e.g. 20–200 microns) or that utilized in fixed bed operations (e.g. 0.1–1 inch).

Is is, however, preferred in the case of FCC operations, that the support be of particle size suitable for use in FCC operations (20–200 microns). Although it is possible to utilize, as the support for removing gaseous sulfur compounds, the fluidized catalyst which is used in FCC operations, it is preferred that this support be a different phase; i.e. even in those instances when it is the same composition as the support for the FCC catalyst (or as the FCC catalyst), it is preferred that it be formulated separately and thereafter mixed with the FCC catalyst.

Typical equilibrium FCC catalysts may include that marketed by Davison Chemical Division of W. R. Grace and Company under the trademark CBZ-1 containing a synthetic crystalline Y-type zeolite in an amorphous silica-alumina matrix having the following characteristics:

TABLE I

| Cracking Catalyst | |
|---|---|
| Property | Value |
| Surface Area, $m^2/gm$ | 105 |
| Pore Volume cc/gm | 0.37 |
| Density, $lb/ft^3$ | |
| Aerated | 47.6 |
| Settled | 51.8 |
| Particle Size Distribution, wt. % | |
| 0–20 microns | 0 |
| 20–40 microns | 0 |
| 40–80 microns | 22 |
| 80+ microns | 78 |
| Average Particle Size, (microns) | 86 |
| Alumina Content, wt. % | 37.7 |
| Sodium Content, wt. % | 0.41 |
| X-Ray Metals, wppm* | |
| Cu | 10 |
| Ni | 220 |
| Fe | 3330 |
| Cr | 310 |
| V | 370 |
| Zeolite Content, wt. % | 7.9 |

*parts per million by weight

Illustrative porous refractory supports which may be employed in the $SO_x$ removing compositions of this invention may include a gamma alumina prepared by calcining for 3 hours at 900° F. (482° C.): the Catapal SB brand of high purity alpha alumina monohydrate marketed by Conoco Chemicals Division of Continental Oil Company. The gamma alumina product is characterized as follows:

TABLE II

| Alumina content*, wt. % | 75% |
|---|---|
| Loss on Ignition, wt. % | 25% |
| Carbon*, wt. % | 0.3% |
| $SiO_2$*, wt. % | 0.008% |
| $Fe_2O_3$*, wt. % | 0.005% |
| $Na_2O$*, wt. % | 0.004% |
| Sulfur*, wt. % | 0.01% |
| $TiO_2$*, wt. % | 0.12% |
| Crystal Structure* | alpha-alumina monohydrate |
| Crystal Structure** | gamma-alumina |
| Surface Area (BET)** | 250 $m^2/g$ |
| Pore Volume** | |
| 0–100 Å | 0.45 cc/gm |
| 0–10,000 Å | 0.50 cc/gm |
| Loose Bulk Density* | 49 $lb/ft^3$ |
| Particle Size Distribution* | 48% < 45 microns |
| | 9% > 90 microns |

*As received
**After calcination for 3 hrs. at 900° F. (482° C.).

In the preferred embodiment, the additive composition of the instant invention is prepared (as on alumina support) separately from the FCC cracking catalyst; and it is then mixed with the FCC catalyst to yield a mixture wherein the additive composition of the instant invention is 1–10 w%, say 6 w% of the total mixture.

It is a feature of this invention that the composition contains (in addition to the porous refractory support) as a first component (i) at least one of bismuth, chromium, or a rare earth metal such as cerium and as a second component (ii) at least one alkali metal, preferably potassium sodium, cesium, or rubidium. Preferred compositions contain potassium and cerium or sodium and cerium.

These compositions may commonly be prepared by immersing the support, typically gamma alumina of 20–200 micron particle size, in aqueous solutions of water-soluble compounds of the component metals. Typical water-soluble compounds may include: acetates, oxalates, or nitrates of cerium and of the alkali metals e.g. sodium, potassium, or cesium. Bismuth may be added to the alumina as a 7 w% solution of $Bi(NO_3)_3 \cdot 5H_2O$ in water which has been acidified with sufficient nitric acid to form a clear solution. It is possible to add all the metals of the two components separately or in one operation.

The rare earth metals include elements of atomic number 57 to 71. This group which is sometimes referred to as the lanthanide series includes lanthanum, cerium, praseodymium, samarium, dysprosium, and other elements which are present in small quantities. These metals are difficultly separable from one another and may be available commercially in a mixture containing about 50 w% cerium, 20–30 w% lanthanum, 15%–20% neodymium, 5–6% praeseodymium, and less than about 5% of the remaining rare earth elements. For purposes of the instant invention it is found that mixtures of rare earths may be employed including those commonly available—which are naturally occurring mixtures which have not been separated into fractions. Although less desirable because of increased cost, available salts of increased purity of cerium or lanthanum may be employed such as cerium nitrate $Ce(NO_3)_3 \cdot 6H_2O$.

In one preferred embodiment, it may be desirable to add the alumina support to a solution of alkali metal hydroxide and thereafter to add a solution of the nitrate of bismuth or cerium. The latter metals are precipitated as their hydroxides or oxides.

The mix may then be dried, e.g. at 212° F.–300° F. (100° C.–140° C.) for 1–24 hours, say 15 hours and then crushed to desired size of 50–200 microns. It may then be calcined at 1300° F.–1500° F. (704° C.–816° C.), say 1400° F. (760° C.) for 3–36 hours, say 24 hours.

More than one metal from each group may be added (e.g. Na and K plus Bi and Ce; or K plus Bi and Ce); it is found, however, that satisfactory (i.e. improved) results may be achieved by use of one metal from each group—e.g. K-Ce; Na-Ce; K-Bi; Na-Bi; etc. The preferred composition contains potassium and cerium: K-Ce.

It is preferred that the first component (preferably bismuth or cerium) be present in the total amount of 0.5–10 w%, preferably 0.5 w%–5 w%, more preferably 1 w%–3 w% of the support, say 3 w%. The second alkali metal component (potassium, sodium, or cesium) is preferably present in amount of 0.4–10 w%, preferably 1 w%–5 w%, more preferably 1 w%–3 w%, say 3 w% of the support. A preferred composition may contain 3 w% potassium (expressed as K) plus 3 w% cerium (expressed as Ce) on gamma alumina prepared from the Catapal SB alumina.

The composition so prepared may in the preferred embodiment be mixed with FCC cracking catalyst and used in an FCCU wherein a sulfur-containing charge hydrocarbon is cracked. Illustrative of the charge hydrocarbons may be a straight run gas oil having API gravity of 22.0-26.4 and containing 0.5-2.5 w% sulfur.

In operation of the FCCU, the charge hydrocarbon is heated to 800° F.-1200° F. (454° C.-538° C.), say 960° F. (516° C.) at atmospheric pressure, and admitted in vapor phase to the reaction zone (a reducing zone) wherein it contacts the fluidized powdered cracking catalyst composition which includes the FCC catalyst and the admixed porous refractory support bearing as a first component (i) at least one of bismuth, chromium, or a rare earth metal such as cerium and as a second component (ii) at least one alkali metal, preferably potassium, sodium, or cesium. The charge sulfur-containing hydrocarbon is cracked to yield vapor containing (i) lighter hydrocarbons including those boiling in the motor fuel range and (ii) hydrogen sulfide and mercaptans. This stream is removed from the reaction zone and subjected to separation operations wherein the hydrocarbons are separated from the sulfur-containing components.

In the reaction zone, there is laid down on the catalyst a deposit of coke-carbon in typical amount of 3.5 w%-5.0 w%, say 4.2 w% of the total weight of the catalyst. The catalyst also accumulates solid, sulfur-containing material derived from the charge sulfur-containing hydrocarbon. Typical sulfur content of the spent catalyst may be 0.03 w%-0.04 w%, say 0.03 w%.

The spent catalyst composition bearing the sulfur-containing coke is passed to a regeneration zone (oxidation zone) wherein it is contacted with oxygen-containing gas (oxygen-enriched air or more preferably, air). As regeneration proceeds at 1100° F.-1500° F. (590° C.-815° C.), say 1350° F. (732° C.) and atmospheric pressure, carbon is burned off the catalyst to form carbon dioxide and carbon monoxide. When regeneration is carried out in the "excess oxygen mode", the amount of air used (typically 180-220, say 220 thousand lbs per hour) is sufficient to produce a regenerator off gas containing 77-83 parts, say 79 parts of inert (e.g. nitrogen) gas, 1-7 parts, say 5 parts of oxygen, less than 1 part, of carbon monoxide, and 14-18 parts, say 16 parts of carbon dioxide.

The sulfur content of the catalyst particles is also oxidized to form sulfur oxides $SO_x$ principally sulfur dioxide and sulfur trioxide.

In prior art operation wherein the catalyst composition contains only the FCC catalyst (and not the additive composition of this invention), the regenerator off-gas may contain 3750-5620, say 4680 w ppm sulfur dioxide and 520-780, say 650 wppm-sulfur trioxide, e.g. 1800-2400 ppm(v), say 2500 ppm(v) of sulfur dioxide and 200-300 ppm(v), say 250 ppm(v) of sulfur trioxide. This corresponds to 4-6%, say 5 w% of the sulfur which is present in the sulfur-containing hydrocarbon charge.

In practice of the process of this invention wherein the catalyst composition includes the FCC catalyst plus the additive composition of this invention, the regenerator off-gas may contain 281-468 w ppm, say 375 w ppm sulfur dioxide and 39-65 w ppm, say 52 wppm sulfur trioxide i.e. 135-225 ppm(v), say 180 ppm(v) of sulfur dioxide and 15-25 ppm(v) of sulfur trioxide, say 20 ppm(v). This corresponds to 0.3-0.5 w%, say 0.4 w% of the sulfur that is present in the sulfur-containing hydrocarbon charge.

In practice of a less preferred embodiment of this invention, the sulfur-removing composition containing porous refractory support bearing as a first component (i) at least one of bismuth, chromium, or a rare earth metal such as cerium and as a second component (ii) at least one alkali metal, preferably potassium, sodium, or cesium may be absent from the FCC catalyst composition; and it may be maintained in a separate bed to which the standard FCC regenerator off-gases are passed and wherein the sulfur is fixed in solid form on the sulfur-removing composition. When this less preferred embodiment is employed, the fluidized particles which have adsorbed the sulfur at 1100° F.-1500° F. (595° C.-815° C.), say 1350° F. (732° C.) are regenerated as by passing an oxygen-containing gas over the catalyst at 850° F.-1000° F. (454° C.-538° C.), say 920° F. (493° C.) at atmospheric pressure.

In practice of the process of this invention, much of the sulfur in the regenerator becomes fixed in solid form (as sulfate, etc.) on the porous refractory support bearing as a first component in at least one of bismuth, chromium, or a rare earth metal such as cerium and as a second component (ii) at least one alkali metal, preferably potassium, sodium, or cesium. The total sulfur content of the fluidized cracking catalyst composition including the additive may be 0.03-0.04 w%, say 0.034 w% (as S) based on total composition.

This sulfur-bearing regenerated catalyst composition is preferably passed to the reaction zone, wherein, under the conditions of reaction, much of the sulfur thereon is released as hydrogen sulfide and mercaptans.

The overall result of this sequence of operations in the typical FCCU is that:
(i) 20-35 w%, of the 2 w% of the sulfur in the charge hydrocarbon is desirably released as hydrogen sulfide and mercaptans in the reaction zone overhead;
(ii) 0.3-0.5 w%, of the 2 w% of the sulfur in the charge hydrocarbon is found in the regenerator off-gas; and
(iii) the $SO_x$ content of the regenerator off-gas is reduced to 150-250 ppm(v), say 200 ppm(v)-cf prior operations undesirably yielding 2000-3000 ppm(v), say 2500 ppm(v).

Practice of the process of this invention will be apparent to those skilled in the art from inspection of the following examples wherein, as elsewhere in this specification, all parts are part by weight unless otherwise stated.

DESCRIPTION OF SPECIFIC EMBODIMENTS

Example I

In this example, which represents the best mode presently known of carrying out the process of this invention, the charge alpha aluminum oxide monohydrate (100 parts) is Catapal SB alumina marketed by Conoco. This product is pure alumina (of 50-200 micron particle size) except for the following impurities:

TABLE

| Component | W % |
| --- | --- |
| $TiO_2$ | 0.12 |
| $SiO_2$ | 0.008 |
| $Fe_2O_3$ | 0.005 |
| Carbon | 0.36 |

TABLE-continued

| Component | W % |
|---|---|
| Sulfur | 0.01 |
| Na$_2$O (plus all alkali metals) | 0.004 |

Water is added to this charge gamma alumina (100 parts) to form a paste. There is added thereto with mixing a solution of 4.30 parts of potassium hydroxide in 50 parts of water. A solution containing 50 parts of water and 9.28 parts of cerium nitrate (Ce(NO$_3$)$_3$, 6H$_2$O) is added to the potassium-containing alumina, mixing well. The mix is dried at 185° F.-230° F. (85° C.-110° C.) for 15-24 hours and then calcined at 1400° F. (760° C.) for 24 hours. Analysis showed that the composition contained alumina, 3 w% potassium, and 3 w% cerium, the latter two percentages based on the alumina. It was then pulverized to 50-200 micron size and mixed with nine times its weight of commercial equilibrium cracking catalyst—Davison CBZ-1 brand catalyst containing originally 15 w% rare earth exchanged Y zeolite plus 85 w% silica-alumina.

This catalyst composition is evaluated for its SO$_x$ emission reduction capacity in a micro activity tester which simulates FCC conditions including the following:

TABLE

| Condition | Value |
|---|---|
| Reaction Zone | |
| Average Temperature (°F.) | 960 |
| (°C.) | 516 |
| Reaction Time (min) | 10 |
| Catalyst Inventory (g) | 10 |
| Pressure | atmospheric |
| Nitrogen Flow rate ml/min | 175 |
| Catalyst: oil (wt ratio) | 3.0 |
| Regeneration Zone - (Complete coke combustion mode) | |
| Air Flow ml/min | 175 |
| Average Temperature (°F.) | Ca 1300 |
| (°C.) | 705 |
| Regeneration Time (min) | 15 |

The charge to the reaction zone, in vapor phase at 920° F. (473° C.), is a synthetic gas oil containing 2 w% sulfur having the following composition:

TABLE

| Property | W % |
|---|---|
| n-dodecane | 90.6 |
| Hexene-1 | 1.0 |
| Benzothiophene | 8.4 |

During evaluation, measurements were made of (i) the SO$_x$ emitted in the regenerator off-gas, these being reported as w% of the sulfur contained in the sulfur-containing hydrocarbon charge and (ii) the sulfide (H$_2$S and mercaptans) contained in the cracked product leaving the reactor overhead—as weight % of the sulfur contained in the sulfur-containing hydrocarbon charge.

The results are tabulated in the Table following Example IX.

Examples II-IX

In Examples II-III and V, other additives falling within the scope of this invention were prepared to give compositions as follows:

| Example | Composition |
|---|---|
| II | 3% Na/3% Ce/Al$_2$O$_3$ |
| III | 3% K/3% Bi/Al$_2$O$_3$ |
| V | 3% Na/3% Bi/Al$_2$O$_3$ |

In control Examples IV* and VI*-VII* various formulations falling outside the scope of the instant invention are made up in manner generally similar to the procedure of Example I. The material tested in control Example VIII* is Catapal SB alumina alone; and in control Example IX*, the material tested is the equilibrium Davison CBZ-1 Brand catalyst.

The results are as follows:

TABLE

| Example | Agent | SO$_x$ | H$_2$S |
|---|---|---|---|
| I | 3% K/3% Ce/Al$_2$O$_3$ | 0.43 | 29 |
| II | 3% Na/3% Ce/Al$_2$O$_3$ | 0.48 | 26 |
| III | 3% K/3% Bi/Al$_2$O$_3$ | 0.57 | 26 |
| IV* | 3% Na/Al$_2$O$_3$ | 0.86 | 25 |
| V | 3% Na/3% Bi/Al$_2$O$_3$ | 0.95 | 26 |
| VI* | 4% Bi/Al$_2$O$_3$ | 1.1 | 27 |
| VII* | 3% K/Al$_2$O$_3$ | 0.85 | 27 |
| VIII* | Al$_2$O$_3$ | 2.4 | 29 |
| IX* | Eq. Davison CBZ-1 | 4.5 | 28 |

*Control Examples

SO$_x$ includes sulfur dioxide and sulfur trioxide in the regenerator off-gas, reported as w% of the sulfur content of the sulfur-containing hydrocarbon charge.

H$_2$S includes hydrogen sulfide plus mercaptans in the reactor off-gas, reported as w% of the sulfur content of the charge sulfur-containing hydrocarbon charge.

SO$_x$ concentrations are generally measurable to within an experimental error of ±0.1%; and the concentrations noted in Examples IV, V, and VII differ by non-significant differences.

From the above Table, it will be apparent that the following conclusions may be drawn:

(i) the compositions of this invention (Ex I-III and V) permit attainment of regenerator off-gas containing less than 1 w% SO$_x$ which is substantially better than that obtained e.g. by use of pure alumina (Ex VIII*) or catalyst alone (Ex IX*);

(ii) the most satisfactory results achieved (Ex I) by use of the preferred composition of this invention are two (i.e. 0.86/0.43) times better than the best control example (Ex IV);

(iii) the results achieved by use of this invention (Ex I) may be more than ten times (4.5/0.43) better than are attained by use of equilibrium Davison CBZ-1 catalyst; etc.

Examples X*-XI

The catalyst composition of Example I and one similar to Example IV* but containing 2w%Na/Al$_2$O$_3$ both in combination with CBZ-1 were subjected to stability tests, by exposing the mixture to water-saturated laboratory air for prolonged times at 1350° F.

In the case of control Example X*, the 2w%Na/Al$_2$O$_3$ composition, the SO$_x$ content of regenerator off-gas was about 0.74% at day 1 and increased up to about 2.08% at day 6.

In contrast, for experimental Example XI (using the catalyst of Example I, the 3%k/3%Ce/Al$_2$O$_3$ composition), the SO$_x$ content was about 0.18% at day 1 and increased only to about 0.4% at day 8!

Results comparable to those attained by Example I may be attained if the catalyst composition contains the following in addition to the 3 w% potassium as the first component:

TABLE

| Example | Composition |
|---------|-------------|
| XII | 3 w% Bi |
|  | 3 w% Ce |
|  | on alumina |
| XIII | 3 w% Cr |
|  | 3 w% Ce |
|  | on alumina |

Example XIV*–XV

In this pair of comparative examples, FCC operations were carried out using an Isthmus vacuum gas oil containing 1.44 w% sulfur utilizing a reactor temperature of 960° F. and a regenerator temperature of 1350° F.

In control Example XIV, the catalyst contained the Davison CBZ-1 brand of commercial catalyst. In experimental Example XV, the catalyst contained 3 w% of additive containing 3 w% potassium and 3 w% cerium on gamma alumina.

Using the control system, the $SO_x$ content of the regenerator off-gas averaged 854 wppm. Using the experimental system, the $SO_x$ content of the regenerator off-gas averaged 566 wppm—an improvement of 34%.

Although this invention has been illustrated by reference to specific embodiments, it will be apparent to those skilled in the art that various changes and modifications may be which clearly fall within the scope of this invention.

We claim:

1. A composition of matter characterized by its ability to serve as catalyst composition for catalytic cracking which comprises (i) a catalytic cracking catalyst and admixed therewith (ii) 1–10 w%, of the total, of additive containing a porous refractory support bearing 0.5–10 w% of at least one of bismuth, chromium, or a rare earth metal and 0.4–10 w% of alkali metal.

2. A composition of matter characterized by its ability to serve as catalyst composition for catalytic cracking which comprises (i) a catalytic cracking catalyst and admixed therewith (ii) 1–10 w%, of the total, of additive containing alumina, as a porous support, bearing 0.5–10 w% of rare earth metal and 0.4–10 w% of potassium or sodium.

3. A composition of matter characterized by its ability to serve as catalyst composition for catalytic cracking which comprises (i) a catalytic cracking catalyst and (ii) 1–10 w%, of the total, of additive containing alumina, as a porous support, bearing 1–5 w% of cerium and 1–5 w% of potassium.

* * * * *